United States Patent [19]

Hora et al.

[11] Patent Number: 5,174,716
[45] Date of Patent: Dec. 29, 1992

[54] PITCH CHANGE MECHANISM

[75] Inventors: Petr Hora; Edwin K. Miller, both of West Chester, Ohio

[73] Assignee: General Electric Company, Cincinnati, Ohio

[21] Appl. No.: 556,145

[22] Filed: Jul. 23, 1990

[51] Int. Cl.⁵ ............................................. B64C 11/32
[52] U.S. Cl. ..................................... 416/26; 416/129; 416/160; 416/162
[58] Field of Search ...................... 416/26, 32, 46, 128, 416/129, 130, 152, 160, 162, 170 R

[56] References Cited

U.S. PATENT DOCUMENTS

| | | |
|---|---|---|
| 2,541,636 | 2/1951 | Chillson . |
| 2,664,960 | 1/1954 | Longfellow . |
| 3,536,415 | 10/1970 | Kusiak . |
| 3,647,320 | 3/1972 | Chilman . |
| 3,672,788 | 6/1972 | Ellinger . |
| 3,687,569 | 8/1972 | Klompas ........................ 416/160 |
| 3,866,415 | 2/1975 | Ciokajlo . |
| 3,893,789 | 7/1975 | Andrews . |
| 3,910,721 | 10/1975 | McMurtry . |
| 3,912,418 | 10/1975 | Andrews et al. . |
| 3,922,852 | 12/1975 | Drabek . |
| 3,964,839 | 6/1976 | Kusiak . |
| 3,994,128 | 11/1976 | Griswold, Jr. . |
| 4,047,842 | 9/1977 | Avena et al. . |
| 4,521,158 | 6/1985 | Fickelscher . |
| 4,534,524 | 8/1985 | Aldrich . |
| 4,657,484 | 4/1987 | Wakeman et al. . |
| 4,660,437 | 4/1987 | Scott . |
| 4,692,093 | 9/1987 | Safarik ........................... 416/152 |
| 4,738,590 | 4/1988 | Butler . |
| 4,738,591 | 4/1988 | Butler . |
| 4,750,862 | 6/1988 | Barnes et al. . |

FOREIGN PATENT DOCUMENTS

| | | |
|---|---|---|
| 58-197499 | 11/1983 | Japan . |
| 531756 | 1/1941 | United Kingdom . |
| 1296063 | 11/1972 | United Kingdom . |
| 2182397 | 5/1987 | United Kingdom . |

OTHER PUBLICATIONS

Article—"A New Design for a Contra-Prop"—Aeronautical Engineering.

Primary Examiner—Edward K. Look
Assistant Examiner—James A. Larson
Attorney, Agent, or Firm—Jerome C. Squillaro; John R. Rafter

[57] ABSTRACT

The invention concerns a pitch change mechanism for an aircraft propeller in which a common ring gear (51) changes pitch of all propeller blades on a given rotor simultaneously. Motion of the ring gear (51) is induced by a planet (40)-and-carrier (101) system driven by a pinion (110). Acceleration of the pinion causes a change toward flat pitch. Deceleration of the pinion causes change toward feathered pitch. If the motor driving the pinion fails, a large deceleration occurs, driving the blades to a safe, feathered position.

3 Claims, 5 Drawing Sheets

PITCH CHANGE MECHANISM

CROSS-REFERENCE TO RELATED APPLICATIONS

This application is related to co-pending U.S. patent application Ser. No. 07/556,242 filed Jul. 23, 1990, for an AIRCRAFT PITCH CHANGE MECHANISM, U.S. patent application Ser. No. 07/556,155, filed Jul. 23, 1990, for PITCH CHANGE MECHANISM FOR PROP FANS, and U.S. patent application Ser. No. 07/550,009, filed Jul. 9, 9190, for a PROP-FAN PITCH-CHANGE MECHANISM.

The invention relates to a mechanism for changing the pitch of aircraft fans and propellers.

BACKGROUND OF THE INVENTION

FIG. 1 illustrates an aircraft 3 powered by counter-rotating propellers 6 and 9 of the ultra-high bypass, unducted fan type. The rotational directions are indicated by arrows 12 and 15. FIG. 2 illustrates a type of turbine system which can be used to drive the propellers 6 and 9.

In FIG. 2, fore propeller 6 is attached to a first turbine 18 which is supported by bearings 21 and 21A and rotates in direction 12 indicated in FIG. 1. The components rotating in this direction are decorated with hatching in FIG. 2. The aft propeller blade 9 is fastened to a second turbine 24 which is supported by bearings 27 and 27A, and rotates in direction 15 of FIG. 1. A hot, high-energy gas stream 30 provided by a gas generator (not shown) causes rotation of the turbines.

Propulsor blades 6 and 9 (which are sometimes called fans or propellers in the art) are of the variable pitch type. Variable pitch means that each blade can rotate about a respective pitch axis 6A or 9A in FIGS. 1 and 2 as indicated by circular arrows 33 and 36. A principal reason for changing pitch is to provide the blades 6 and 9 with the angle of attack which is proper for the present engine power level and airspeed of the aircraft.

OBJECT OF THE INVENTION

It is an object of the invention to provide an improved pitch change mechanism for ultra-high bypass, unducted fan aircraft engines.

SUMMARY OF THE INVENTION

In one form of the invention, a pair of ring gears is associated with each set of propulsor blades, and both ring gears are coaxial with the axis of rotation of the blades. The ring gears rotate about the axis of rotation along with the propulsors. When there is no relative rotation between the two ring gears of one pair, there is no pitch change. However, when relative rotation between the ring gears does occur, motion of a gear system (or other linkage) causes a change in pitch.

DETAILED DESCRIPTION OF THE INVENTION

Figure 3:
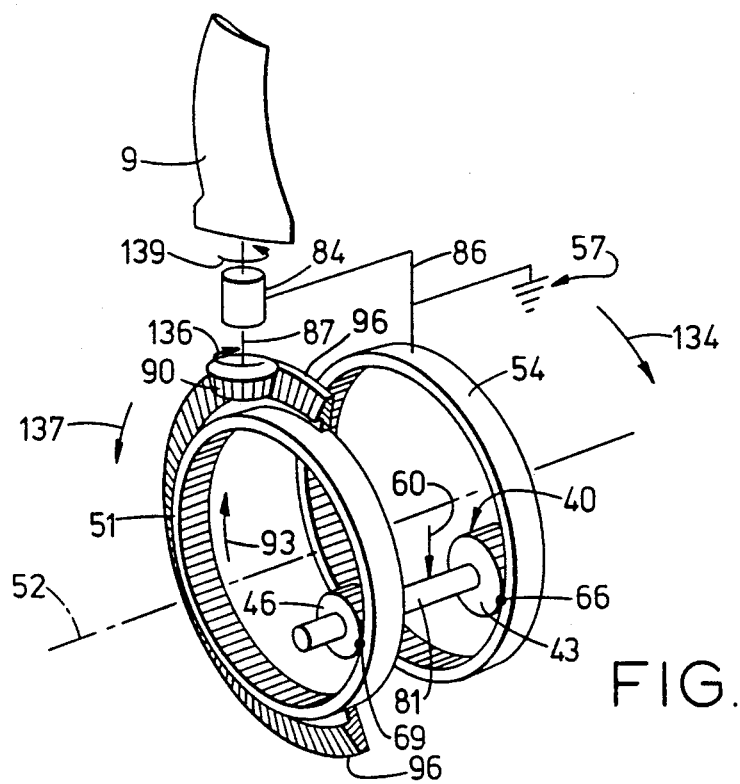
FIG. 3 illustrates a simplified form of the invention.
Figures 6, 7:
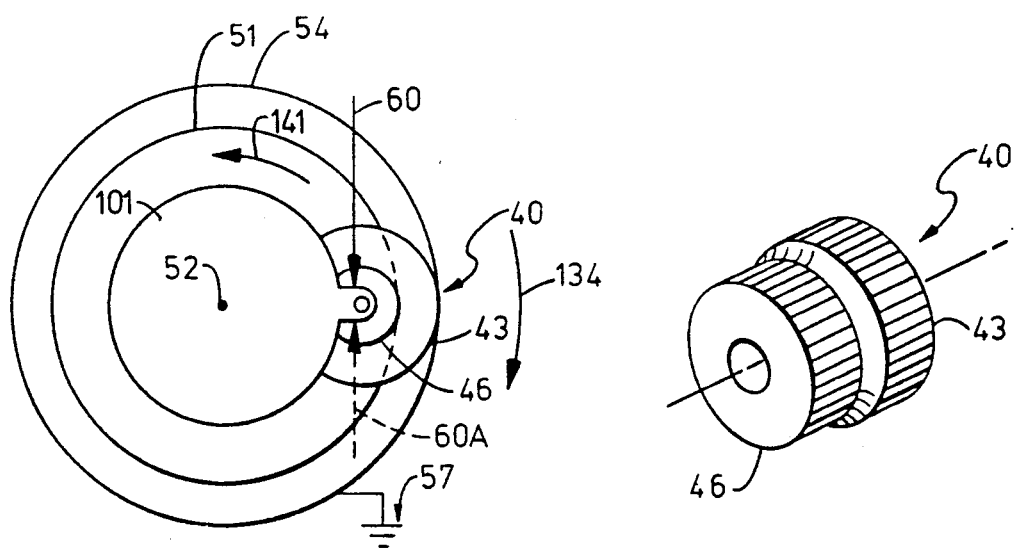
FIG. 6 is a simplified view of FIG. 5.
FIG. 7 illustrates the compound gear 40 in FIG. 6.

A schematic of one form of the invention is shown in FIG. 3, part of which is shown in FIG. 6. FIG. 6 illustrates a compound planetary gear 40, also shown in FIG. 7, having a large diameter gear 43 attached to a smaller diameter gear 46. The compound gear 40 is supported by a rotatable carrier 101 and both the compound gear 40 and the carrier 101 are free to rotate about an axis 52. A pair of inner and outer ring gears 51 and 54, the latter being larger in diameter than the former, engage the compound gear 40. The larger ring gear 54 is restrained against rotation as indicated by ground symbol 57. If a torque 60 is applied to carrier 101, the latter rotates in direction 134 and causes the compound gear 40 to roll relative to ring gears 51 and 54, thus inducing relative rotation in ring gears 51 and 54. This relative rotation can be explained by reference to FIGS. 8 through 10.

Figure 8:
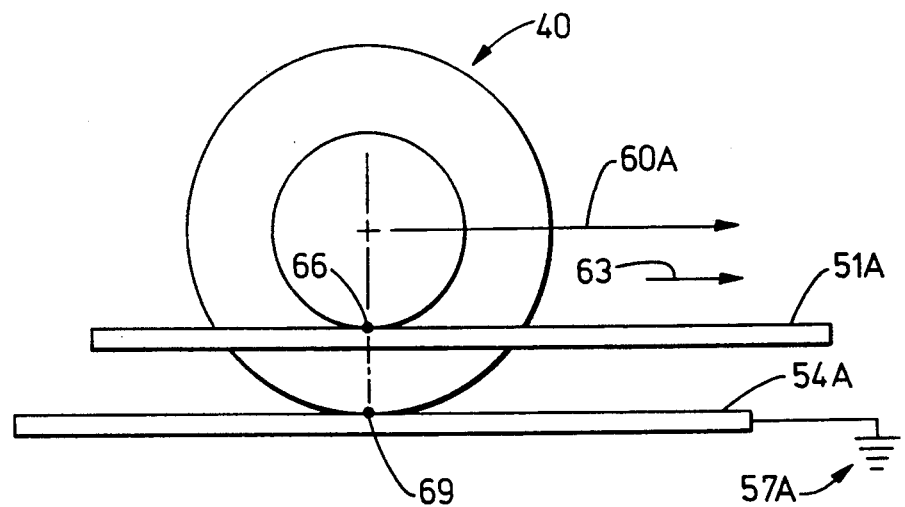
FIGS. 8-10 illustrate schematically the motion of gears 51 and 54 in FIG. 6.

In FIG. 8, ring gears 51 and 54 in FIG. 6 are shown as flat surfaces 51A and 54A. That is, in FIG. 8, the ring gears are shown as having infinite diameters. Surface 54A, representing large ring gear 54, is restrained against movement as indicated by ground symbol 57A. If the compound gear 40 is drawn to the right as indicated by arrow 60A, surface 51A (ie, the smaller ring gear 51) is driven to the right as indicated by arrow 63. This motion of surface 51A can be further explained with reference to FIG. 9, wherein tangent points 66 and 69 in FIG. 8 are shown and are viewed as pivot points at which a lever 72 is fastened to the surfaces 51A and 54A. If the lever 72 is pulled to the right, as indicated by arrow 75, surface 51A is driven to the right as indicated by arrow 63A.

The preceding discussion has explained that motion of the compound gear 40 in FIG. 6 induces a relative rotation of ring gears 51 and 54. In addition, as will now be explained in connection with FIG. 10, a mechanical advantage can be obtained by force 60 in FIG. 6 over the motion of the ring gears.

Figure 9:
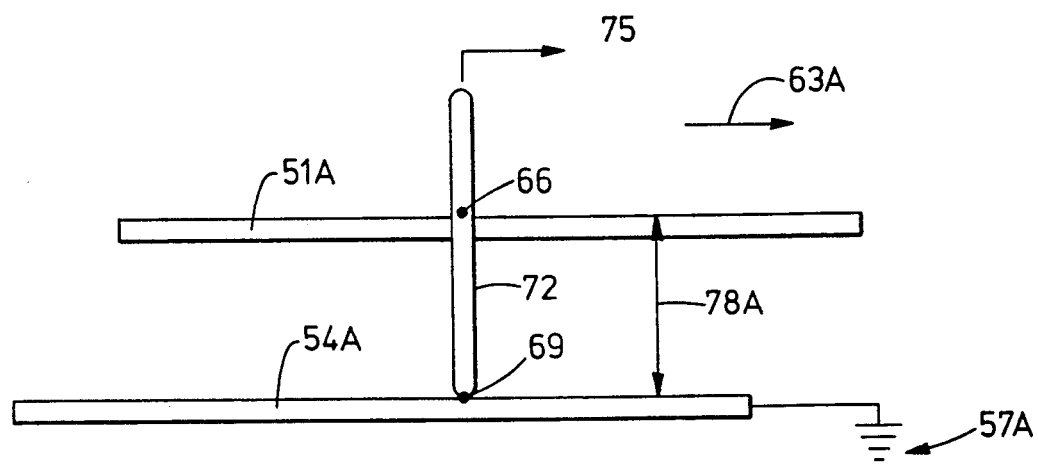
Figure 10:
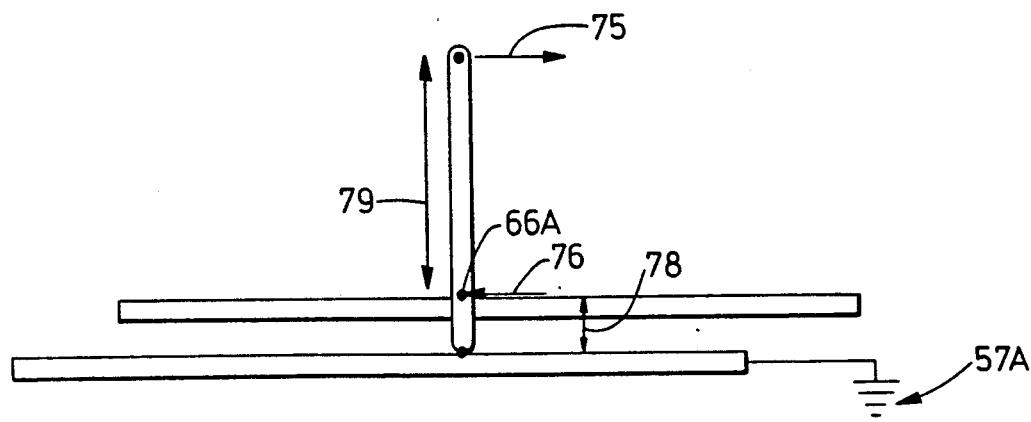

FIG. 10 shows a different separation 78 between between the flat surfaces 51A and 54A, as compared with the separation 78A in FIG. 9. In FIG. 10, force 75 has a mechanical advantage over the resisting force 76 at point 66A. The numerical value of the advantage is the ratio of (distance 79 +distance 78)/(distance 78). Restated, the ratio shows that when distance 78 becomes smaller (ie, the closer are gears 43 and 46 to having the same diameter), the mechanical advantage of force 60 in FIG. 6 becomes larger.

The mechanism of FIG. 6 can be used to induce a pitch change in an aircraft propeller, as will now be explained by returning to FIG. 3. In FIG. 3, the compound planetary gear 40 of FIG. 6 is illustrated slightly differently: small gear 46 and large gear 43 are both fastened to a shaft 81. Ring gear 54 is fixed to the propulsor rotor, as indicated by ground symbol 57, and thus can be viewed as fixed with respect to the blades 9. (The propulsor rotor is the rotating structure associated with the blades 9 in FIG. 2, and includes, for example, turbine blades 24.)

Further, a support bearing 84 is connected to the fixed ring gear 54 by an arm 86. Bearing 84 supports a shaft 87 connecting between a small bevel gear 90 and the propulsor blade 9, and allows pitch change of blade 9 to occur, as indicated by circular arrow 136.

When carrier torque 60 is relayed to compound gear 40, rotation of the movable ring gear 51, as indicated by arrow 93, is induced with respect to the fixed ring gear 54, as described above in connection with FIG. 6. This rotation causes an annular bevel gear 96, which is fastened to, and concentric with, the movable ring gear 51, to rotate as indicated by arrow 93, thus causing the small bevel gear 90 to rotate, inducing the change in pitch as indicated by arrow 136.

Figure 4:
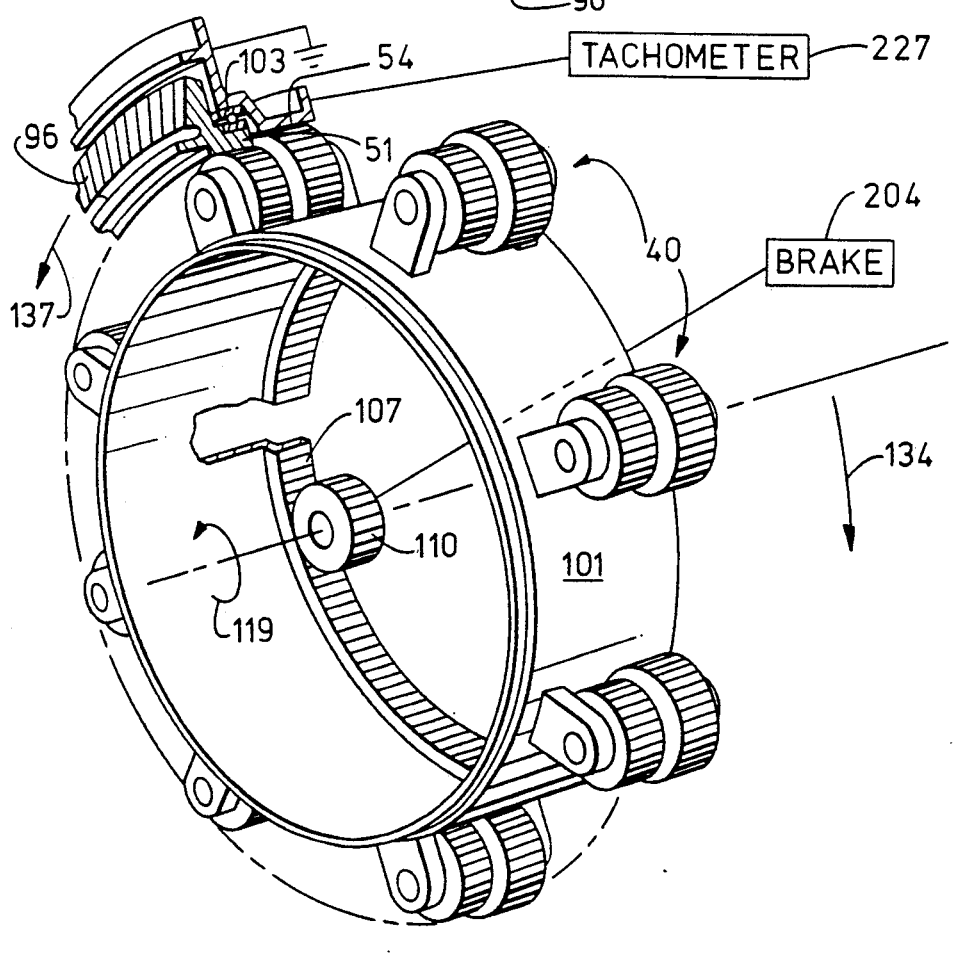
FIG. 4 illustrates a less simplified form of the invention.

The schematic representation of FIG. 3 is shown in more detail in FIG. 4. In FIG. 4, a multiple of identical compound gears 40, as opposed to the single compound gear 40 in FIG. 3, are shown and they are supported by a carrier 101. Bevel gear 96 corresponds to bevel gear 96 in FIG. 3, and ring gears 51 and 54 correspond to their respective counterparts in FIG. 3. A bearing 103 in FIG. 4 allows relative rotation between ring gears 51 and 54.

In operation, when no pitch change is desired (that is, when pitch is to remain fixed), carrier 101 rotates at a synchronous speed with both ring gears 51 and 54. That is, the system behaves as if the compound gears 43 and 46 in FIG. 3 were welded to respective ring gears 54 and 51 at tangent points 66 and 69.

However, when pitch change is desired, the carrier 101 in FIG. 4 is either accelerated or decelerated with respect to ring gears 51 and 54 by use of a carrier ring gear 107 (not previously discussed) which is internal to the carrier 101. This acceleration and deceleration can be accomplished by using a pinion gear 110.

It should be remembered that the explanation given above regarding FIGS. 3 and 6 was given in a non-rotating context: fixed ring gear 54 was not rotating, and movable ring gear 51 was only rotating when induced to do so by the motion of compound gear 40, which was induced by torque 60. However, in flight operation, ring gears 51 and 54 rotate along with the propulsor blades 6 and 9 in FIG. 2. Now, ring gear 54 is fixed in the sense that it does not rotate with respect to shaft 87: however, ring gear 54 does rotate at synchronous speed along with both the shaft 87, and the propulsor blade 9 to which the shaft 87 is attached.

Therefore, when the carrier 101 in FIG. 4 is at synchronous speed with the ring gears 51 and 54, the carrier 101 is rotating at the same rpm as the propulsors and the ring gears 51 and 54. Consequently, pinion gear 110 is constantly rotating, as indicated by arrow 119, even when pitch remains steady. An increase in speed of the pinion gear 110 will cause the carrier 101 to rotate faster than fixed ring gear 54. Relative movement between the carrier 101 and the fixed ring gear 54 now occurs, and the analysis given above with regard to FIGS. 3 and 6 applies: pitch changes.

Similarly, when the carrier 101 is forced, by a deceleration of the pinion gear 110, to rotate slower than the fixed ring gear 54, a pitch change occurs, but in opposite direction. The reversal in the direction of pitch movement which accompanies a change in relative speed between the fixed ring gear 54 and the movable ring gear 51 will be explained in greater detail.

"Fixed" ring gear 54 in FIG. 6 is actually rotating about axis 52, and in the direction of arrow 134, shown also in FIGS. 3 and 4. Further, the rotation is at synchronous speed with propulsor blade 9 in FIGS. 2 and 3. Still further, in the absence of pitch change, movable ring gear 51 is also rotating at synchronous speed about axis 52 in FIGS. 3 and 6, as is carrier 101 in FIG. 4.

When pitch change is desired, torque 60 in FIG. 6 causes carrier 101 in FIG. 4 to rotate faster than fixed ring gear 54, thus causing the movable ring gear 51 to rotate faster than the fixed ring gear 54. (In the case of the apparatus of FIG. 4, the torque 60 is caused by an increase in speed of the pinion 110.) Consequently, even though both ring gears 51 and 54 in FIG. 3 are rotating in the same direction, as indicated by respective arrows 93 and 134, arrow 93 represents a faster speed. Thus, annular bevel gear 96 moves with respect to the fixed ring gear 54, rotating the small bevel gear 90 as indicated by arrow 136, causing a change in pitch.

However, if reverse torque 60A in FIG. 6 is applied to carrier 101, movable ring gear 51 rotates in the direction of arrow 141, opposite to the direction previously described. This opposite rotation corresponds to a decrease in speed of pinion 110 in FIG. 4: ring gears 51 and 54 in FIG. 3 are still rotating absolutely in the same direction indicated by respective arrows 93 and 134, but now arrow 93 indicates a slower speed than arrow 134. Thus, the annular bevel gear 96 in FIGS. 3 and 4 moves in the direction of arrow 137 with respect to fixed ring gear 54, thus causing the small bevel gear 90 to rotate in direction arrow 139 in FIG. 3.

Therefore, if movable ring gear 51 rotates faster than fixed ring gear 54, pitch changes in one direction. If gear 51 rotates slower, pitch changes in the opposite direction.

Figure 5:
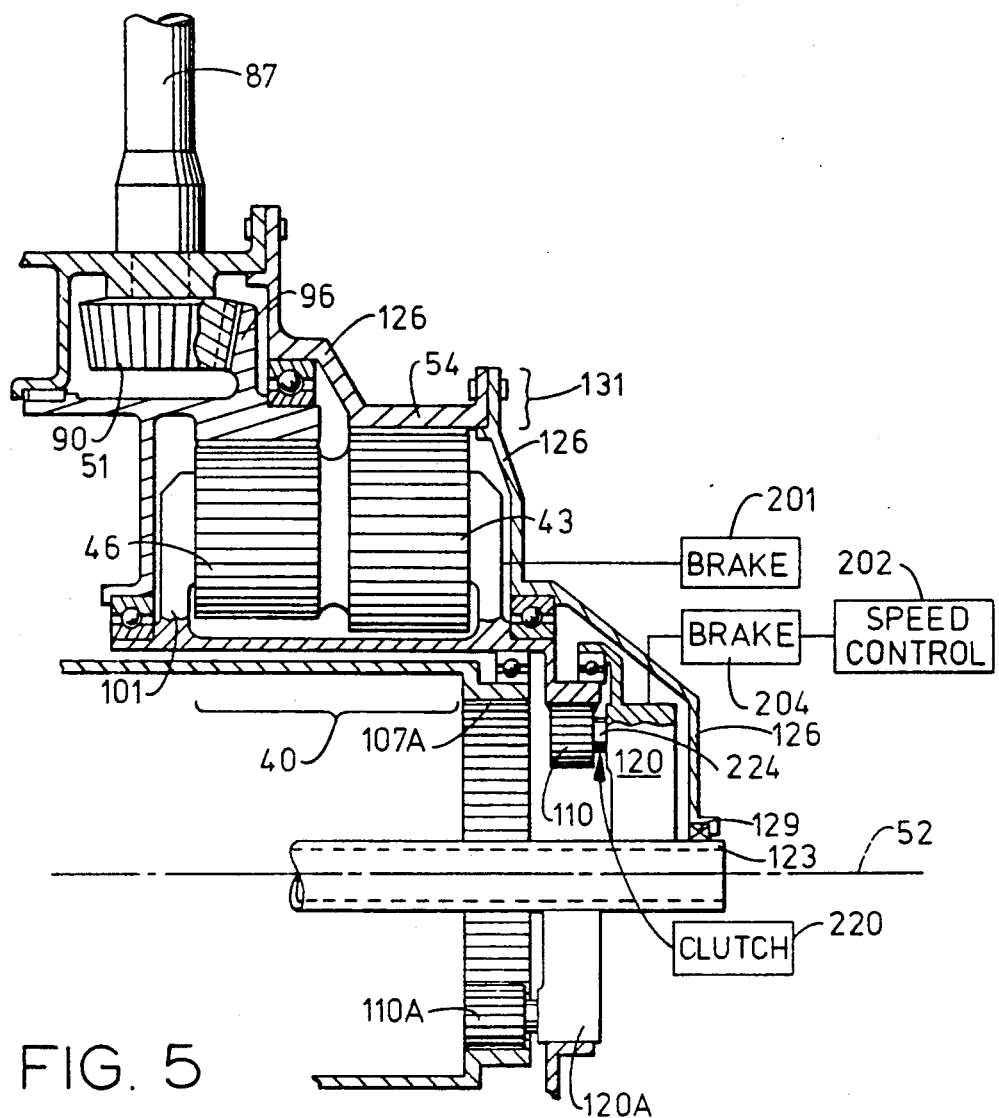
FIG. 5 illustrates one form of the invention.

FIG. 5 illustrates one form of the invention in greater detail. In that Figure, shaft 87 corresponds to shaft 87 in FIG. 3, as do small bevel gear 90 and annular bevel gear 96 with respect to their counterparts in FIG. 3. Further, fixed ring gear 54, movable ring gear 51, compound gears 40, carrier 101, carrier ring gear 107, and pinion gear 110 are all shown in FIG. 5.

In addition, FIG. 5 illustrates a motor 120 which drives the pinion gear 110. It is noted that motor 120 is fixed in an absolute sense: motor 120 does not rotate about axis 52. Motor 120 is fastened to a support 123, about which an annular bracket 126 rotates on bearing 129. Fixed ring gear 54 is attached to bracket 126, at region 131. Consequently, bracket 126 rotates at synchronous speed with propulsor blade 9.

Figure 2:
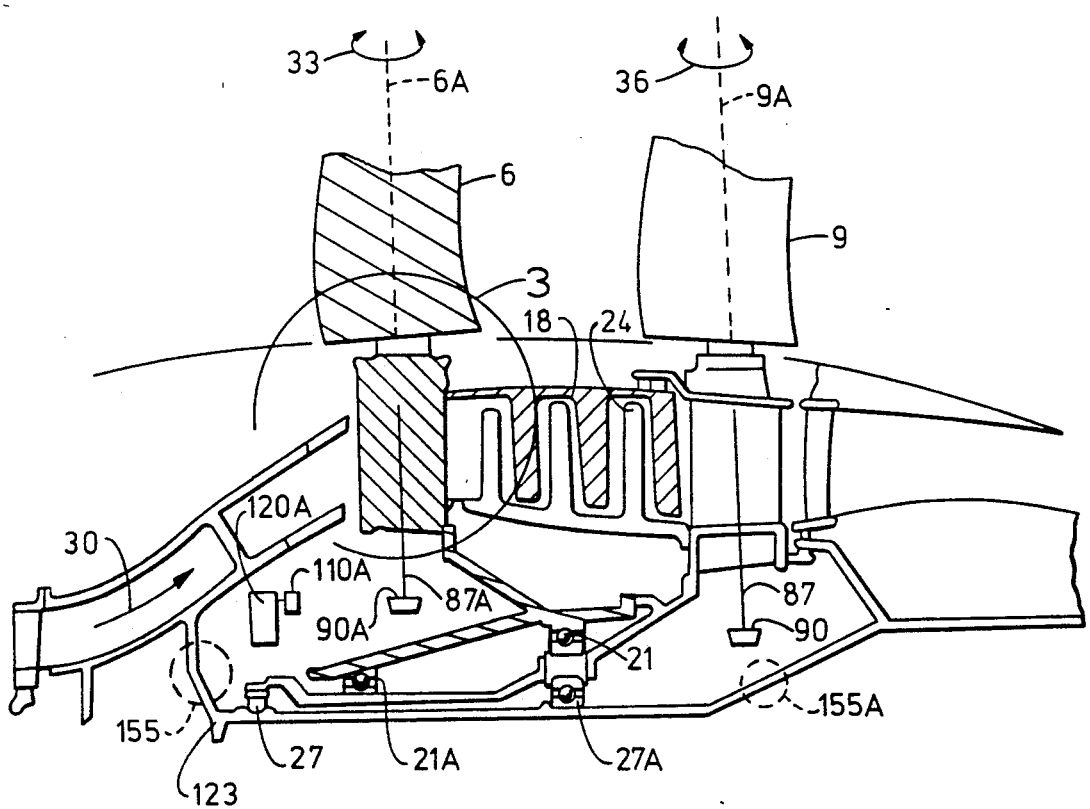
FIG. 2 illustrates a counter-rotating propulsor of a gas turbine engine.

An apparatus for changing the pitch of propulsor blade 9 in FIG. 2 has been described. The apparatus of FIG. 5 is positioned in FIG. 2 such that shaft 87 and small bevel gear 90 are located as shown in FIG. 2, and used for changing pitch of the aft propulsor 9 in the manner described above. Motor 120 is positioned near region 155A in FIG. 2.

A second apparatus, substantially identical to that shown in FIG. 5, is used to change pitch of the forward propulsor 6 in FIG. 2. The second apparatus is positioned such that a corresponding shaft 87A and small bevel gear 90A are positioned as shown in FIG. 2. A second fixed motor 120A drives the bevel gear 90A.

Alternately, the second fixed motor 120A can be mounted on support 123, as shown in FIG. 5. In such a case, motor power is be brought forward by a shaft 107A, which drives a second carrier (not shown) located near the forward bevel gear 90A. The operation of the apparatus which controls pitch of forward blade 6 in FIG. 2 is identical to that described above for the rear blades 9.

Several important features of the invention are the following.

1. The invention can automatically counter the effects of the centrifugal twisting moment (CTM) of the propulsor blades 6 and 9.

Figure 1:
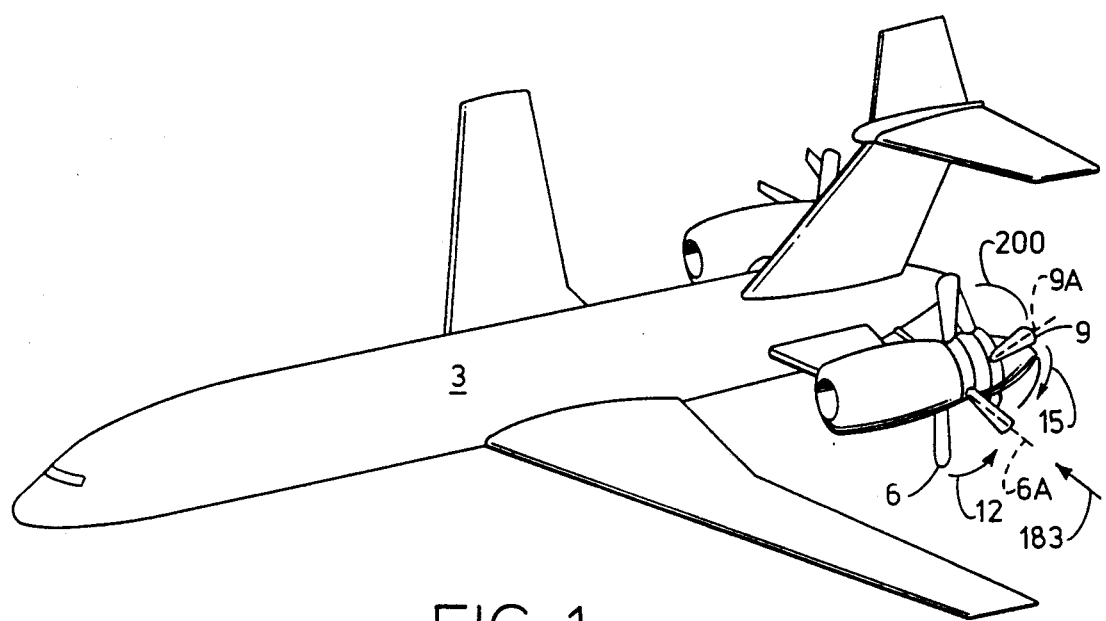
FIG. 1 illustrates an aircraft with which the invention can be used.
Figures 11, 12:
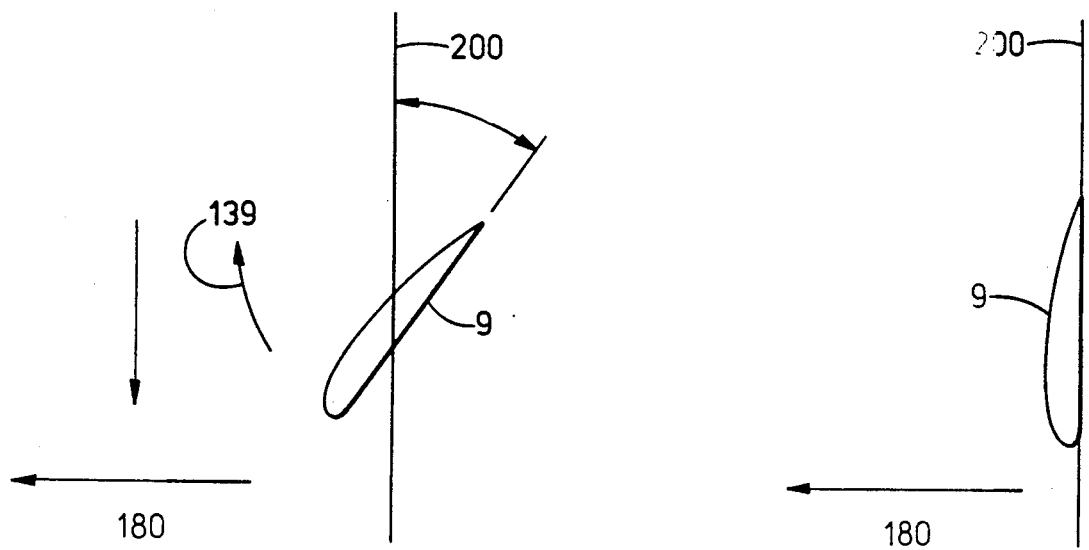
FIGS. 11-13 illustrate various pitch positions of propellers.

CTM will be explained with reference to FIGS. 11 and 12. Those Figures are views of a propulsor blade 9 in FIG. 1, taken along a radius running in the direction of arrow 183. In FIGS. 11 and 12, arrow 180 indicates the direction of travel of the aircraft 3 in FIG. 1. Circumference 200 in FIG. 1 indicates the path traced by the tips of blades 9, and is also shown in FIGS. 11 and 12.

CTM causes the blade 9 to assume a pitch (termed "flat pitch") indicated in FIG. 12, as opposed to the pitch used in normal flight, which is shown in FIG. 11. The reader need not understand the mechanics driving the blade 9 into the position of FIG. 12, only that CTM causes a specific type of pitch change.

When a blade assumes flat pitch, as in FIG. 12, the load placed upon the turbine 24 in FIG. 2 decreases drastically, thus allowing the turbine to accelerate the propulsor rotor and perhaps cause a dangerous increase in propulsor rotor speed.

The invention opposes the flat pitch tendency caused by CTM by virtue of the very high gear ratio of about 2,126 to 1 (ie, over two thousand to one) between the motor 120 and the propulsor blade 9. The high ratio causes pinion gear 110 to have a large mechanical advantage over bevel gear 90. Therefore, centrifugal twisting moment of the blade 9 can be overcome merely by friction in the gear train between the motor 120 and the blade 9, as well as by drag in the motor 120 driving pinion gear 110.

Stated another way, the CTM is trying to accelerate the movable ring gear 51 relatively to the fixed gear 54, while both (a) the drag in the motor 120 and (b) the friction between the carrier 101 and the motor are slowing the gear 51 down. The combined effects of the acceleration and slow-down is to cause a pitch increase.

In the event that an engine failure occurs, eliminating the high energy gas stream 30 in FIG. 2, the invention can feather the propulsor blades automatically, without added mechanisms and even if the motor 120 in FIG. 5 malfunctions. The feathering results from (1) the continued rotation of the propulsor blades, caused by windmilling, and (2) the drag of gear 110 in FIG. 5, caused by the motor malfunction. The combination of (1) and (2) causes the ring gears 51 and 54 to rotate with respect to each other, because the drag of gear 110 causes the carrier 101 to become asynchronous with fixed ring gear 54 (ie, with the propulsor blades 9).

As described above, when the carrier 101 becomes asynchronous with the propulsor blades 9, a pitch change occurs. The gear train in FIG. 3 is designed such that this pitch change drives the propulsor 9 into a feathered position, rather than into a flat pitch position.

The drag of the gear 110 is caused by the inherent friction of the motor 120. Additional drag can be imposed by a brake 201, or a speed control 202 applied to the motor 120. Further, a motor malfunction is not necessary to attain feathered pitch: the speed control 202 can retard the motor 120 in order to feather the blades.

It is to be understood that the system must be designed such that the inherent drag on carrier 101 (caused by the rotational resistance of pinion 110 and motor 120) opposes, and does not assist, CTM. For example, in the configuration shown in FIG. 3, drag 60A on gear 40 (ie, on carrier 101 in FIG. 4) induces a pitch change in direction 139 when the propulsor blade 9 is rotating in direction 134. That is, a resistance torque indicated by arrow 60A causes movable ring gear 51 in FIG. 3 to rotate in the direction of arrow 137 relative to fixed ring 54, thus rotating blade 9 in the direction of arrow 139. This pitch change, in the direction of arrow 139, is opposite to CTM (indicated by arrow 136) in the case of blade 9 as shown in FIG. 11.

However, for a propulsor rotating in the opposite direction, as in forward blade row 6, the drag on carrier 101 must then also be in the opposite absolute direction in order to feather the blades. If the forward blade row is rotating in the direction of arrow 137 in FIG. 3, then a drag 60 must be applied. Otherwise, carrier motion will reinforce, not oppose, CTM.

3. Pitch can be reversed without changing the direction of rotation of pinion 110. That is, as discussed above, it is a deviation in speed of carrier 101 in FIG. 4 from a speed synchronous with fixed ring gear 54 which causes a change in pitch. The deviation can take the form of either an increase in speed or a decrease in speed of carrier 101 with respect to the fixed ring gear 54. This feature eliminates the necessity of expending energy and time to overcome the inertia of motor 120 in order to reverse motor direction. To repeat, decreasing the speed of pinion 110 in FIG. 4 increases blade pitch, that is, drives blades closer to feathered position, while increasing speed of the pinion 110 decreases blade pitch, driving the blades closer to fine pitch.

Figure 13:
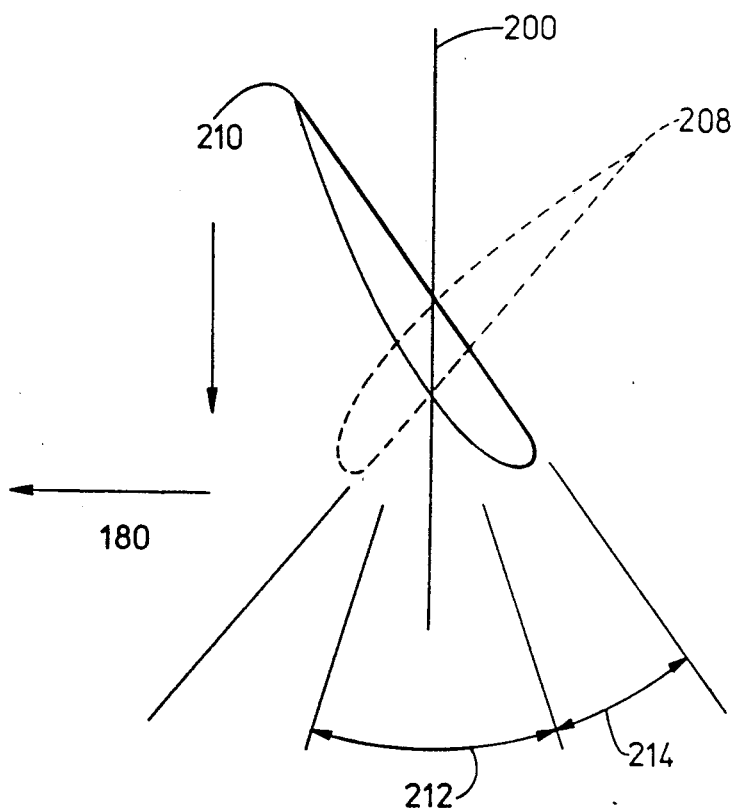

4. The propulsor blades are driven into a reverse pitch position, that is, from phantom position 208 to solid position 210 in FIG. 13, during aircraft landing. At this time, the motor 120 driving the pinion 110 in FIG. 5 is preferably operated at maximum speed when the blade makes an excursion through region 212 in FIG. 13. The inertia of the motor and gear system under these high-speed conditions assists in completing the excursion into reverse pitch and assists in overcoming the increase in torque opposing the motor which will be encountered in region 214. The opposing torque is mainly caused by the increased CTM upon the propulsor blade in region 214. The increased load produces a torque which opposes the completion of the drive into reverse pitch.

5. The use of a fixed motor 120 in FIG. 5 eliminates the need for transfer of electric power (or other kinds of power, such as hydraulic or pneumatic) across a rotating interface.

6. Long life of the drive motors 120 and 120A in FIG. 5 is expected because of the low power required during constant speed operation.

7. Contrary to the situation when the propulsors are rotating, when they are non-rotating, the drive motor 120 must be reversed to change pitch. That is, as stated above, when the propulsor is rotating, acceleration of the motor 120 changes pitch in one direction, while deceleration changes pitch in the other direction. The acceleration causes relative motion between the ring gears 51 and 54 in one direction, while the deceleration causes relative rotation in the opposite direction.

However, when the propulsor is non-rotating, deceleration of the movable ring gear 54 is impossible because the movable ring gear has already stopped. Therefore, an absolute change in direction by the movable ring gear must occur.

8. A clutch 220, known in the art, can be interconnected on shaft 224 in FIG. 5 between the pinion 110 and the motor 120 in order to disconnect the motor from the pinion, thereby rendering the pinion free-wheeling in the event the motor 120 were to lose power and attempt to stop. In such a case, carrier 101 would be allowed to maintain synchronous speed with fixed ring gear 54 in FIG. 4 to thereby maintain pitch stable in its present position.

A second clutch 201 may be desirable to lock the carrier 101 in FIG. 5 to the fixed ring gear 54 to ensure synchronous speed and fixed pitch, during malfunction of motor 120. It is to be noted that, insofar as a clutch couples and decouples a rotating first element from a second element, a clutch can function as a brake when the second element is non-rotating. Thus, clutch 201 may be viewed as a brake.

9. A second brake 204 may be desirable to brake either the pinion gear 110 or the carrier 101 in FIG. 4 in order to assist the system in attaining a feathered position. In such a case, a tachometer 227 can be used to monitor propulsor speed. If propulsor speed becomes excessive, power to the motors 120 can be terminated, and, if necessary, clutch 220 discussed in paragraph 8 above, together With brake 204, can be activated, both in the pursuit of driving the blades toward a feathered position in order to increase load and decrease fan speed. Thus, the invention can be used as a speed-governing device.

14 Motor 120 can be electric, hydraulic, pneumatic, or of other types.

Numerous modifications and substitutions can be undertaken without department from the true spirit and scope of the invention as defined in the following claims. What is desired to be secured by Letters Patent is the invention as defined in the following claims.

We claim:

1. A pitch-change mechanism for aircraft propulsor blades, comprising:
    a) an axis of rotation of the propulsor blades;
    b) a motor rotating a gear wherein:
        i) said motor includes a rotating shaft directly engaging said gear;
        ii) said motor constantly rotates said gear even when blade pitch remains constant;
        iii) said motor is mounted to a stationary support in such a manner that said motor rotating shaft is offset relative to said propulsor blade axis of rotation;
        iv) said motor operates at maximum speed during aircraft landing when the propulsor blades are driven into a reverse pitch position; and
    c) gear train means for
        i) linking the gear with propulsor blades;
        ii) maintaining a constant blade pitch when gear speed is constant;
        iii) increasing blade pitch when gear speed decreases; and
        iv) decreasing blade pitch when gear speed increases.

2. The pitch-change mechanism of claim 13 wherein said gear train means comprises:
    a) a first ring gear which is fixed with respect to propulsor blades;
    b) a second ring gear which is movable with respect to the propulsor blades;
    c) a linkage which induces pitch-change of the propulsor blades in response to motion of the second ring gear with respect to the first ring gear; and
    d) means for inducing relative rotation between said first and second ring gears, wherein said inducing means comprises a plurality of compound planet gears supported by a rotatable carrier with each of said compound planet gears including a pair of gears of different tooth number.

3. The pitch-change mechanism of claim 2, further comprising:
    a) a clutch which disconnects said motor from said gear when said motor loses power;
    b) a first brake which locks said rotatable planet gear carrier to said first ring gear when said motor malfunctions, thereby fixing pitch;
    c) a second brake applied to said gear in order to assist in attaining a feathered pitch position; and
    d) wherein said gear train means:
        i) changes pitch in response to rotation of said motor regardless of whether the propulsor blades are rotating;
        ii) changes pitch during rotation of the propulsor blades without said motor changing direction;
        iii) provides a mechanism advantage of said gear over the propulsor blades; and
        iv) causes drag that drives the propulsor blades toward a feathered pitch when said motor malfunctions and the propulsor blades are rotating.

* * * * *